United States Patent
Alcorn (12)

(10) Patent No.: US 6,556,218 B1
(45) Date of Patent: Apr. 29, 2003

(54) METHOD AND APPARATUS FOR GENERATING DIPS FOR USE WITH JAVA BEANS

(75) Inventor: John William Alcorn, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/210,197

(22) Filed: Dec. 10, 1998

(51) Int. Cl.[7] ................................................. G06F 9/45
(52) U.S. Cl. ....................................... 345/749; 345/762
(58) Field of Search ................................. 345/749, 759, 345/762, 763, 826, 760, 825, 816, 840, 845, 744–747; 717/1, 3, 11; 707/100; 709/201

(56) References Cited

U.S. PATENT DOCUMENTS

| | | | | |
|---|---|---|---|---|
| 5,933,144 A | * | 8/1999 | Alcorn | ....................... 345/762 |
| 5,945,989 A | * | 8/1999 | Freishtat et al. | ............. 345/762 |
| 6,151,700 A | * | 11/2000 | Fox | ................................ 717/3 |
| 6,185,730 B1 | * | 2/2001 | LeBlanc | ......................... 717/1 |
| 6,209,125 B1 | * | 3/2001 | Hamilton et al. | ............... 717/4 |
| 6,263,498 B1 | * | 7/2001 | Alcorn et al. | .................. 717/11 |
| 6,330,711 B1 | * | 12/2001 | Knutson | ......................... 717/1 |

* cited by examiner

Primary Examiner—Steven Sax
(74) Attorney, Agent, or Firm—Duke W. Yee; David A. Mims, Jr.; Betty Formby

(57) ABSTRACT

A method and apparatus in a computer for creating a framework for a dip. Settings are displayed for the dip in a graphical user interface. Entries for each setting are received for the dip through the graphical user interface, wherein the overall policies of the dip are formed. A source code for the dip is generated using the selected settings, wherein the source code forms the framework for the dip.

36 Claims, 14 Drawing Sheets

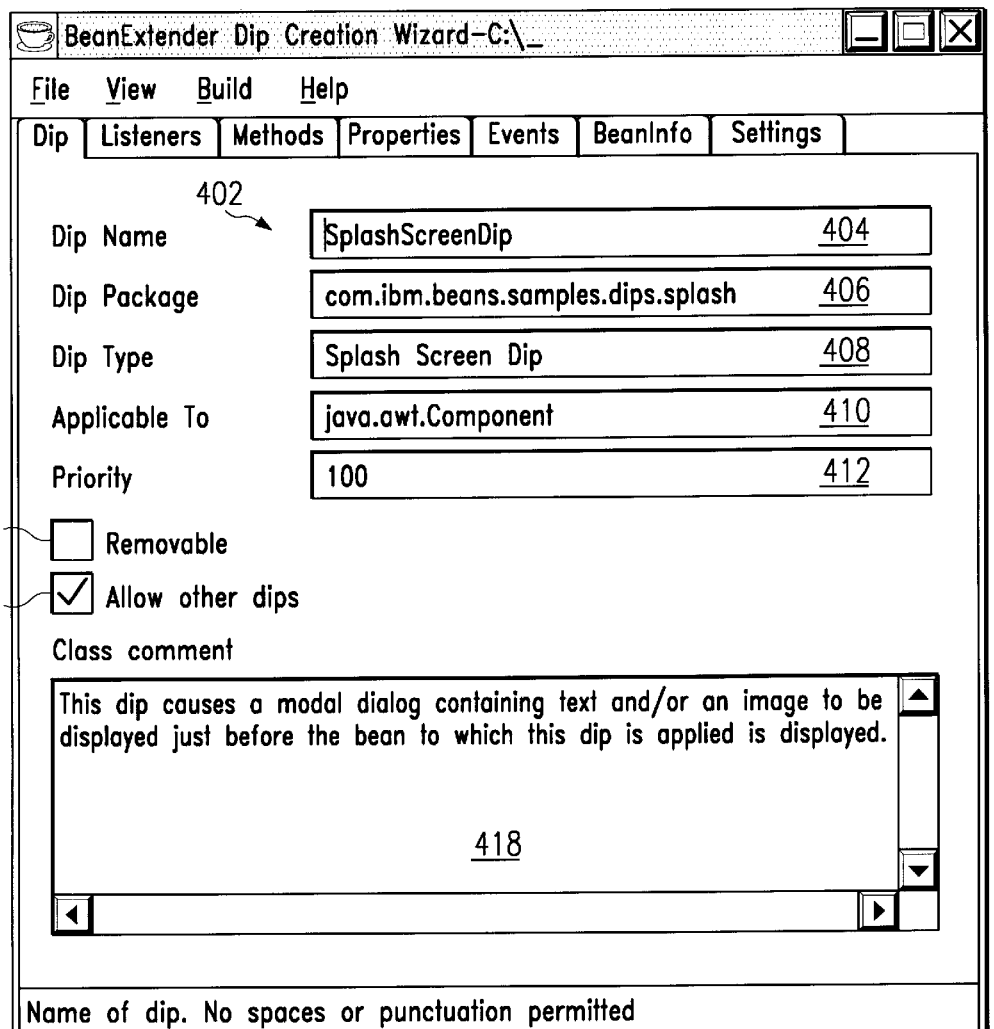

400

```
[if PRIORITY: defined == "YES"]
/**
*Returns the priority of this dip in relation to all other dips.
*This priority is used to determine which dips are acted on first.
*The default priority is 500 — a higher number means the dip gets
*notifications before other dips.
*
*@return The desired priority of this dip.
*@see com.ibm.beans.dip.Dipinfc#priority()
*/                                                             600
public int priority()
{
return #PRIORITY#:
}
```

```
[/if]
[if CREATE_IMPLEMENTATION:defined== "YES"]

/**
*Indicates whether this dip has a separate Implementation class for its
*policy, and if this dip can be applied to the specified dippable bean.
*
*@param obj The bean being dipped. This is the only reference to this
*     dip's dippable bean that will ever be provided to the dip.
*@exception DipRejectAdditionException This exception is thrown if the
*     dip rejects being added to the bean.
*@return null, indicating this dip Implements its own policy.
*@see com.ibm.beans.dip.Dip#createImplementation()
*/
public Object createImplementation(Object obj) throws DipRejectAdditionException
{
  if (obj instanceof #DIPPABLE_TYPE#) {
      myDippableBean=(#DIPPABLE_TYPE#) obj:

//Place initialization code here
  } else {
      throw new DipRejectAdditionException("Dippable bean must extend
#DIPPABLE_TYPE#");
}/* endif*/ return null;                                                 602
}
[/if]
```

*FIG. 6A*

```
[if METHOD_CALL_LISTENER;defined== "YES"]
  /**
   *Wires the dip to receive notification immediately after the specified
   *methods of the dippable bean are called.
   *
   *@parem impl This value should be <tt>null</tt>. There is no separate Implementation.
   *@param methods An array of method signatures from the dippable bean.
   *@exception DipRejectAdditionException This exception is thrown if the
   *     dip rejects being added to the bean.
   *@return Array of DipMethodCallListeners with this dip set to
   *     listen at the appropriate method indices.
   *@see #handleMethodCall
   *@see com.ibm.beans.dip.Dip#createMethodCallListener()
   */
public DipMethodCallListener[] createMethodCallListener(Object impl, String[]methods) throws
DipRejectAdditionException
{
//LetSimpleDip create and initialize the listener array
//Note that the method CallListeners array comes from SimpleDip
super.createMethodCallListener(impl,methods);

'ifHOOKED_METHOD_CALL:defined == "NO"]
    for(int I = 0; I<methodCallListeners.length; I++) (
        methodCallListeners[I] = this;
    }/* endfor */

'/if]
'if HOOKED_METHOD_CALL:defined == "YES"]
    int count=0;
    for (int I = 0; I<methodCallListeners.length; i++) {
repeat HOOKED_METHOD_CALL]

if (methods[i].IndexOf("#HOOKED_METHOD_CALL#")!=.1) {
        methodCallListeners[i] = this;
        count++;
    }/* endif */

'repeat]
    }/* endfor */ if (countI=#HOOKED_METHOD_CALL_COUNT#)
        throw new DipRejectAdditionException$"Some methods required by the dip were not wrapped.");
```

FROM FIG. 6B

```
'if]

return methodCallListeners;
}

/**
*Responds to bound method of the dippable bean being invoked.
*
*@param evt A MethodCallEvent object describing the event source
*      and the property that changed.
*@see com.ibm.beans.dip.MethodCallListener#handleMethodCall
*/
public void handleMethodCall(MethodCallEvent evt)
{
   //Place code here for responding to bound method calls

[if HOOKED_METHOD_CALL:defined == "YES"]
[repeat HOOKED_METHOD_CALL]

if (evt.getMethodId().IndexOf("#HOOKED_METHOD_CALL#")(=-1) {
     //Place code here for responding to "#HOOKED_METHOD_CALL#"
   }/* endif */

[/repeat]
[/if]
}
[/if]
```

*FIG. 6C*  604

METHOD AND APPARATUS FOR GENERATING DIPS FOR USE WITH JAVA BEANS

CROSS REFERENCE TO RELATED APPLICATION

The present invention is related to an application entitled Method And Apparatus For Attaching An Informational Dialog To A Java Bean, attorney docket no. AT9-98-397, filed even date hereof, assigned to the same assignee and incorporated herein by reference.

BACKGROUND OF THE INVENTION

1. Technical Field

The present invention relates generally to an improved data processing system and in particular to object-oriented programming systems. Still more particularly, the present invention relates to a method and apparatus for generating dips through a graphical user interface.

2. Description of Related Art

Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. These bytecodes are executed by a Java interpreter. A Java interpreter is a module in the JVM that alternately decodes and executes a bytecode or bytecodes.

A Java bean is a reusable component. Furthermore, since Java beans are a form of component software, it is often the case that one Java bean will be created by connecting together, or "aggregating", several Java beans from various sources to form an application. Changing functionality in a Java bean, however, is normally difficult and requires altering the source code to add or change the functionality and then recompiling the altered source code to generate a new bean with the desired change and functionality. It would be advantageous to have an improved method and apparatus for altering the functionality in a Java bean without having to obtain and alter the source code for the Java bean.

SUMMARY OF THE INVENTION

The present invention provides a method and apparatus in a computer for creating a framework for a dip. Settings are displayed for the dip in a graphical user interface. Entries for each setting are received for the dip through the graphical user interface, wherein the overall policies of the dip are formed. A source code for the dip is generated using the selected settings, wherein the source code forms the framework for the dip.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a diagram of a morphing operation in accordance with a preferred embodiment of the present invention;

FIG. 3 is a diagram of a dipping operation in accordance with a preferred embodiment of the present invention;

FIG. 4A–4I are diagrams of a graphical user interface used in generating a dip in accordance with a preferred embodiment of the present invention;

FIGS. 6A, 6B, and 6C are examples of source code that may be found within a source code template in accordance with a preferred embodiment of the present invention.

DETAILED DESCRIPTION OF THE PREFERRED EMBODIMENT

Figure 1:
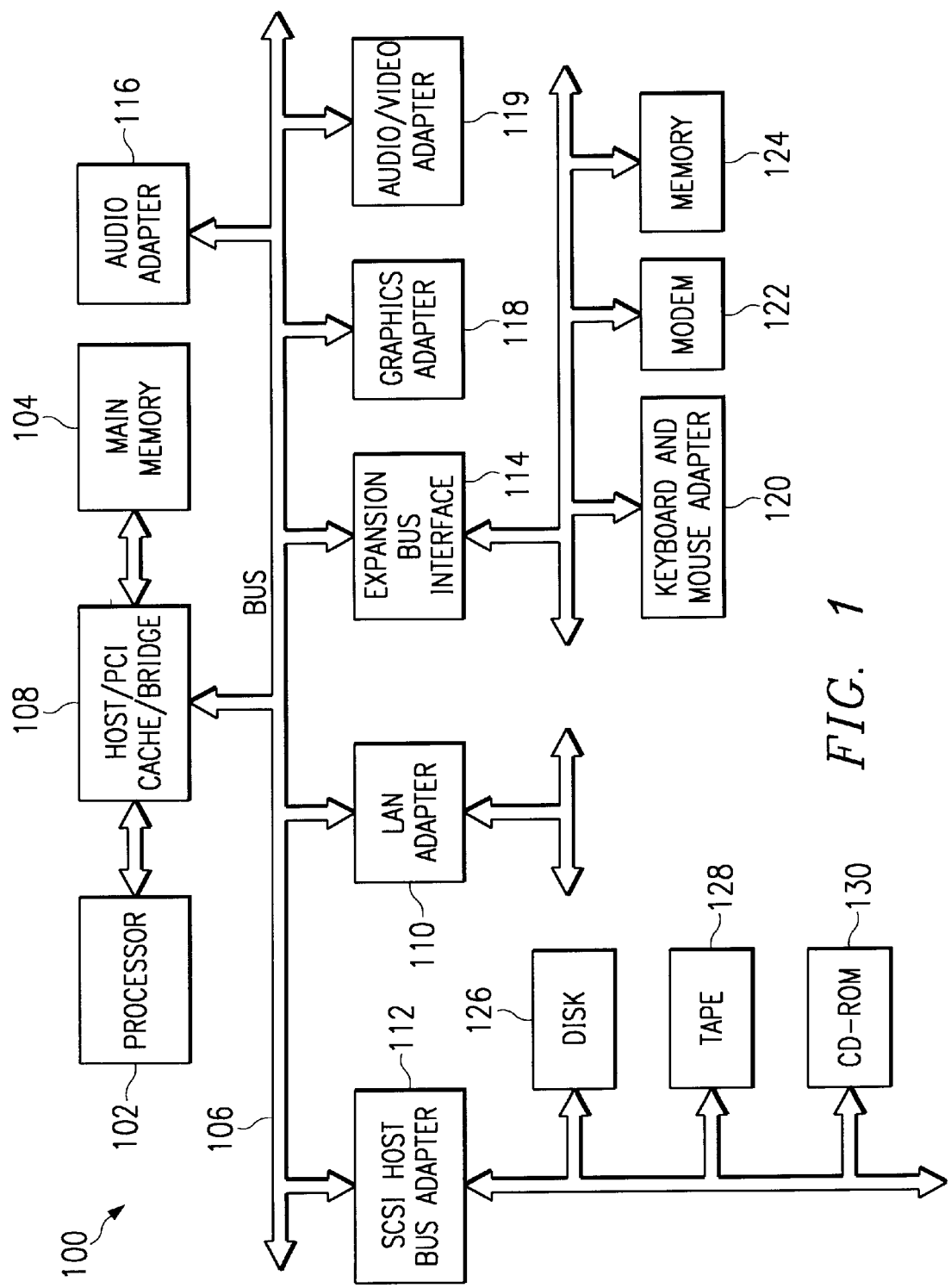
FIG. 1 is a block diagram of a data processing system in which the present invention may be implemented.

With reference now to the figures and in particular with reference to FIG. 1, a block diagram of a data processing system 100 in which the present invention may be implemented is illustrated. Data processing system 100 may be used either as a server or a computer. Data, processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business. Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented programming system, and applications or programs may be located on storage devices, such as hard disk drive 126 and may be loaded into main memory 104 for execution by processor 102

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides a method, data processing system, and instructions for creating software components called dips for use with Java beans. The present invention provides a mechanism for generating dips based on user selections within a graphical user interface (GUI). In response to the selections made through the GUI, a source code skeleton is generated for the desired dip. With this source code skeleton, the logic for the desired functions in a dip may be added to complete the dip. The source code skeleton.generates any necessary code for methods used by the dip to interface with a dippable bean. In addition, code for Java bean properties and events may be generated. Support files, such as bean information also may be generated for the dip. The present invention may be applied to enhance the functionality of Java applications including applets deployed on the Internet.

In the depicted examples, the processes of the present invention are implemented using the Java programming system, which is an object oriented programming system. Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Objects are defined by defining "classes", which are not objects, butt templates, which instruct a compiler how to construct the actual object. For example, a class may specify the number and type of data variables and the steps involved in the functions, which manipulate data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation Process and prevents the program from being run.

Polymorphism allows objects and functions which have the same overall format, but which work with different data, to function differently to produce consistent results. For example, an object may have the format of attribute data and methods to support a geometric shape. The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance, which allows program developers to reuse pre-existing programs. Inheritance allows a software developer to define classes and the objects, which are later created from them as related through a class hierarchy. Specifically, classes may be designated as subclasses of other basic classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

A set of predefined, interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

With reference now to FIG. 2, a diagram of a morphing operation is depicted in accordance with a preferred embodiment of the present invention. A morphing operation is applied to object 202 to create a new dippable object 204. Dippable object 204 is object 202 with modifications that allow it to accept additional behavior in the form of a dip. A "dip" is a class that has an interface that allows the class to be used by a dippable object. In essence, dippable object 204 looks and behaves like object 202, but has the added ability to accept behavioral modification components. Object 202 may be a Java class, such as, for example, a flight reservation program used to select and make reservations for airline flights or a gaming program. When the object is morphed through morphing operation 200, the object becomes a dippable object. The dippable object may have its behavior modified or have behavior added to it. Morphing results in a new class that looks and behaves like before, but has the function of accepting new behaviors in the form of dips. For example, new behavior in the form of an information dialog may be added to the flight reservation program or gaming program in accordance with a preferred embodiment of the present invention.

Turning now to FIG. 3, a diagram of a dipping operation is depicted in accordance with a preferred embodiment of the present invention. After an object has been made dippable, behavior modifications may be made using dipping operation 300. Dipping operation 300 uses dippable object 302 and dip 304 as inputs to attach dip 304 to dippable object 302. A dip is an implementation of a dip interface (a class), which allows the class to perform two things: (1) a dip allows an instance of a class which implements the dip interface to be associated with (attached to) an instance of a dippable class, and (2) a dip allows an instance of the class which implements the dip interface, which has been associated with an instance of a dippable class, to modify the behavior of an instance of the dippable class. Dipping is the operation, which associates an instance of the dip class with an instance of a dippable class. Dip 304 encapsulates behavior that is to be added to dippable object 302. In addition, dip 304 controls dippable object 302 with respect to the added behavior. For example, with a flight selection program that has been morphed to be dippable, a dip in the form of an informational dialog containing copyright notice may be added to the flight selection program without having to modify the code or instructions for the flight selection program.

Morphing and dipping are both used to modify a program to add or modify behavior of the object. In accordance with a preferred embodiment of the present invention, these processes are employed to add informational dialogs. In addition, added or modified behavior may be easily removed at a later time by removing the dip. Morphing is a means by which an existing class is examined and duplicated as a subclass such that all methods, events, and properties of the original class can have "before" and "after" notifications performed. In addition, any "before" notification can also veto the execution of the method, property, or event. This mechanism is handled by applying a dip to the subclass resulting from the morphing. The dip then uses the "before" and "after" notifications to modify the behavior of the subclass and therefore the original class. The combined subclass and dip(s) are then saved as a single component. More information on morphing and dipping objects are found in assignee's co-pending U.S. patent application entitled "An Object Oriented Programming System With Objects For Dynamically Connecting Functioning Programming Objects With Objects For General Purpose Operation", LeBlanc et al., Attorney Docket AT9-97-359, Ser. No. 08/953,345, filed Oct. 17, 1997, which is incorporated herein by reference. In this application, "morphing" is described as a process for creating hooks in a connecting object which fires events to notify interested object. Morphing is the means by which an original general purpose bean is extended using a connecting layer to hook the original bean's property changes, event generation, and method calls and notify any interested context layer objects (dips) to produce a dippable general purpose bean.

To begin, one must understand dips. Dips are beans (reusable software components) that react to state changes in dippable beans to which they are attached. Dippable beans are beans that have been run through a morphing tool, in which the bean is wrapped with an Application Programming Interface (API), so that dips can be applied. Dips modify the runtime behavior of the beans to which they are attached, but they do not provide new interfaces on beans to which they are attached. Dips are attached through the EventListener model. This one-way communication mechanism, while limiting, can be used to add behaviors to a dippable bean. However, if the original bean was thread safe, its dippable version remains thread safe. If the original bean was immutable, the original bean part of the dippable bean remains immutable. The original bean part is what is visible to the clients of the bean. Though dips can add behavior, they cannot add new properties, events, or methods to the bean.

A dip contains two parts with a first part being the API that supports the policy and implementation of all dips. The second portion of a dip is the part of a dip that makes the dip unique. This second portion includes the logic that provides the functionality of the dip. The policy dictates when a dip can interact with a dippable class. A dip may bind and constrain the properties, methods and events of a given dippable bean. Constraining a property, method, or event means that the dip has veto authority over the execution of that property, method or event. Binding a property, method or event means that the dip is notified after changes to the property, method, or event.

The dipping framework allows the user to take an existing Java class and produce a new class to which dips can be applied. This can be done in one of the following ways: (1) take an existing class and create a new dippable class as a child of the original, parent class; or (2) take an interface and a corresponding implementation class and create a new dippable class that implements the interface and uses the implementation, class.

In each case, the new dippable class implements the dippable interface. If desired, the new dippable class could implement the dippable extended interfaces which is a child of the dippable interface. Therefore, all dippable classes, even those implementing the dippable extended interface, are implementations of the dippable interface.

During the creation of a new dippable class, dips can be added to the class definition of the dippable bean. Because dips can be added to an instance of a dippable, bean, instances of the same class can have different behaviors applied to them through the dipping process. The dipping concept creates a step between development and deployment for Java applications. This step allows new behaviors to be added to existing binary objects.

A dippable bean allows dips to intercept properties, methods, and events. All set<PropertyName>( ) (1) methods are treated as property-related. All fire<EventName>( ) or process<EventName>( ) methods are treated as event-related.

The dipping framework works outside of a beans environment and works on any Java class that follows the Java beans naming strategy.

Turning next to FIGS. 4A–4I, diagrams of a graphical user interface used in generating a dip are depicted in accordance with a preferred embodiment of the present invention. The example in these figures illustrates the creation of a dip using the processes of the present invention. The dip created in this example is a dip that causes a dialog containing text and/or an image, to be displayed just before the bean to which the dip is applied is displayed. In this example, the dip will have the following behavior: the dip will work with all other dips, the dip will not be removable, the dip will have a low priority, the dip will only be applicable to beans that inherit from java.awt.Component, the dip will have two properties: one property for the name of the image file to be displayed, one property for the text to appear in the TextArea; the dip will provide a method call listener to all beans it is applied against. This listener will listen for the addNotify ( ) method of the dippable bean to be invoked, and will respond by displaying the "splash" dialog. The dip will listen for an ActionEvent, which gets generated when the dismissal button is pressed. The dip will have a customizer. The dip will have the necessary BeanInfo file, and the dip will have the other associated classes and makefile.

In FIG. 4A, GUI 400 is provided for presenting various selections to a user in creating a dip. GUI 400 also provides for other user input in naming and providing information for the dip. Through GUI 400 the user creates settings for the dip. These settings are used to form policies for the dip. In the depicted examples, policies are the rules controlling the dip. For example, a policy may be whether the dip is removable.

Still referring to FIG. 4A, a dip page 402 is displayed in GUI 400. Dip page 402 allows for the user to define settirigs that determine the basic policy of the dip along with providing information necessary to implement methods. The information entered in dip page 402 also is used to determine the location and file names of the emitted files and to which type of beans this dip may be applied. The dip name is entered in field 404. The dip name is the class name for the dip. The dip package is entered in field 406 while the dip type is entered in field 408. The dip type is an arbitrary text stream used to identify the dip to a user. The bean type to which the dip may be applied is entered in field 410. Field 410 is used to specify to which bean or to an interface that, a bean must implement to have this dip applied to the bean. A default allows for this dip to be applied to any bean. A priority may be set for the dip in field 412. When a bean has multiple dips applied to it, a priority is used to determine the order in which each dip receives notification of an action occurring within the original bean. The higher the priority number results in the dip being notified earlier with respect to other dips. Option 414 allows for the dip to be removable from the bean to which the dip has been applied while option 416 specifies whether the dip will veto attempts to apply additional dips to the bean to which this dip is applied. Commentary about the dip may be entered into field 418. The information in field 418 provides text to be placed before a class definition and is used as the class description in documentation.

Figure 4B:
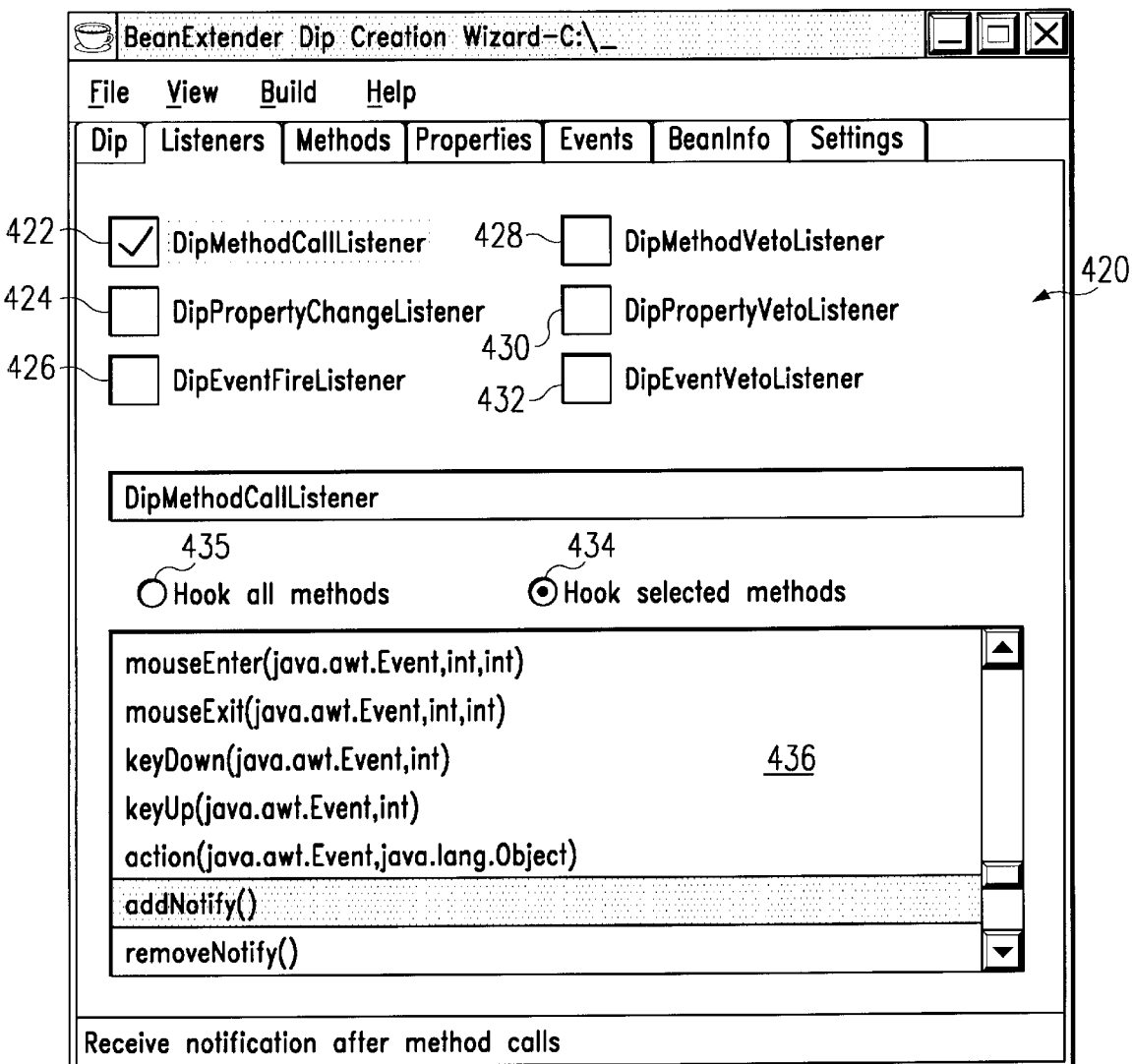

In FIG. 4B, GUI 400 presents a listeners page 420 which provides settings to specify what notifications the dip is interested in receiving. In the depicted example, the following options are present for notifications: DipMethodCallListener 422, DipPropertyChangeListener 424, DipEventFireListener 426, DipMethodVetoListener 428, DipPropertyVetoListener 430, and DipEventVetoListener 432. DipMethodCallListener 422 allows the dip to bind to a method call after it occurs. DipPropertyChangeListener 424 allows the dip to bind to a property after the property is changed. DipEventFireListener 426 allows the dip to bind to an event after it is fired. DipMethodVetoListener 428 allows the dip to constrain a method call before it occurs. DipPropertyVetoListener 430 allows the dip to constrain a property before the property is changed. DipEventVetoListener 432 allows the dip to constrain an event before it is fired. Selection of option 434 results in only selected methods being hooked by the dip. Selection of option 435 will result in all methods being hooked by the dip.

In this example, listeners page 420 specifies that the dip is only interested in receiving notification of method calls on fits dippable bean as shown by the selection of DipMethodCallListener option 422. In addition, by selecting option 434, which is used to hook selected methods and by selecting addNotify ( ) in list box 436, the user has indicated that the dip is only interested in receiving a method call notification when the addNotify ( ) method is invoked. The list of methods presented in list box 436 are obtained by introspecting the class or interface entered in field 410 in dip page 402 in FIG. 4A.

Figure 4C:
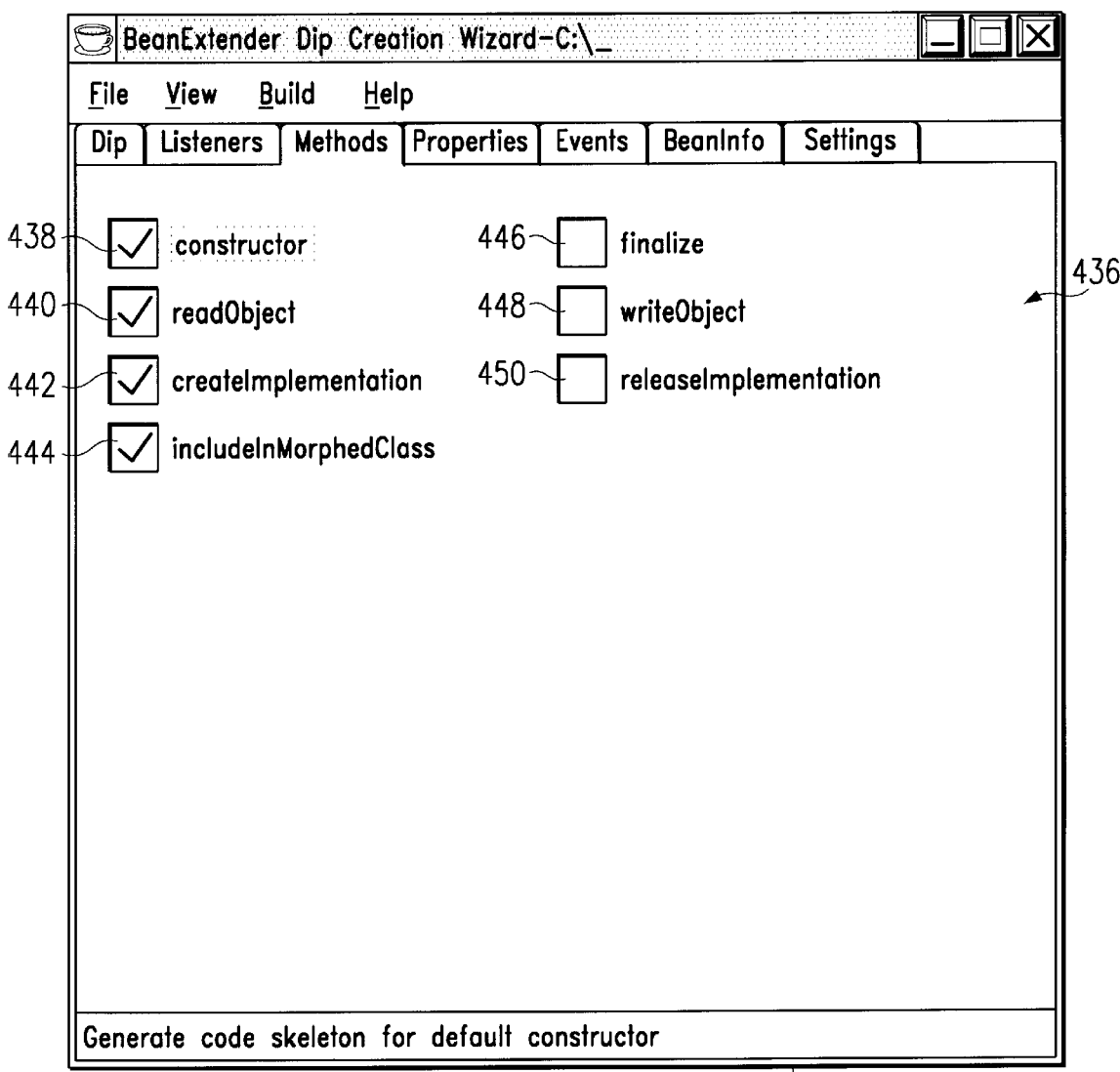

Next in FIG. 4C, GUI 400 displays a methods page 436, which allows the user to specify additional methods to be emitted. In this example, options 438–444 have been selected for use. Option 438 allows initialization code to be entered that will be run when the dip is first instantiated. Option 440 allows transient data initialization code to be entered that will be run when the dip is deseialized. Options 438 and 440 result in constructor and readObject methods to be used to perform initialization. Option 442 allows code to be entered to run when the dip is applied to a bean. This option selects a createImplementation method used to verify that each bean applied to a dip is a descendant of java.awt.Component, which was specified in field 410 in dip page 402 in FIG. 4A. As a result, this dip will reject being applied to a bean if it is not a descendant of java.awt.Component. Option 444 allows specification of which methods to override when morphing a bean which is only applicable if this dip is added as a pre-dip. The selection of option 444 results in the inclusion of a IncludeInMorphedClass method which specifies that only the addNotify ( ) method selected in listeners page 420 needs to be overridden when morphing a bean for use with this dip. Option 446 allows cleanup code to be entered that will be run when the dip gets garbage collected. Option 448 allows special serialization control code to be entered that will be run when the dip is serialized. Option 450 allows cleanup code to be entered that will be run when the dip is removed from its dippable bean. In this example, options 446–450 are for the methods finalize, writeObject, and releaseImplementation, respectively.

Figure 4D:
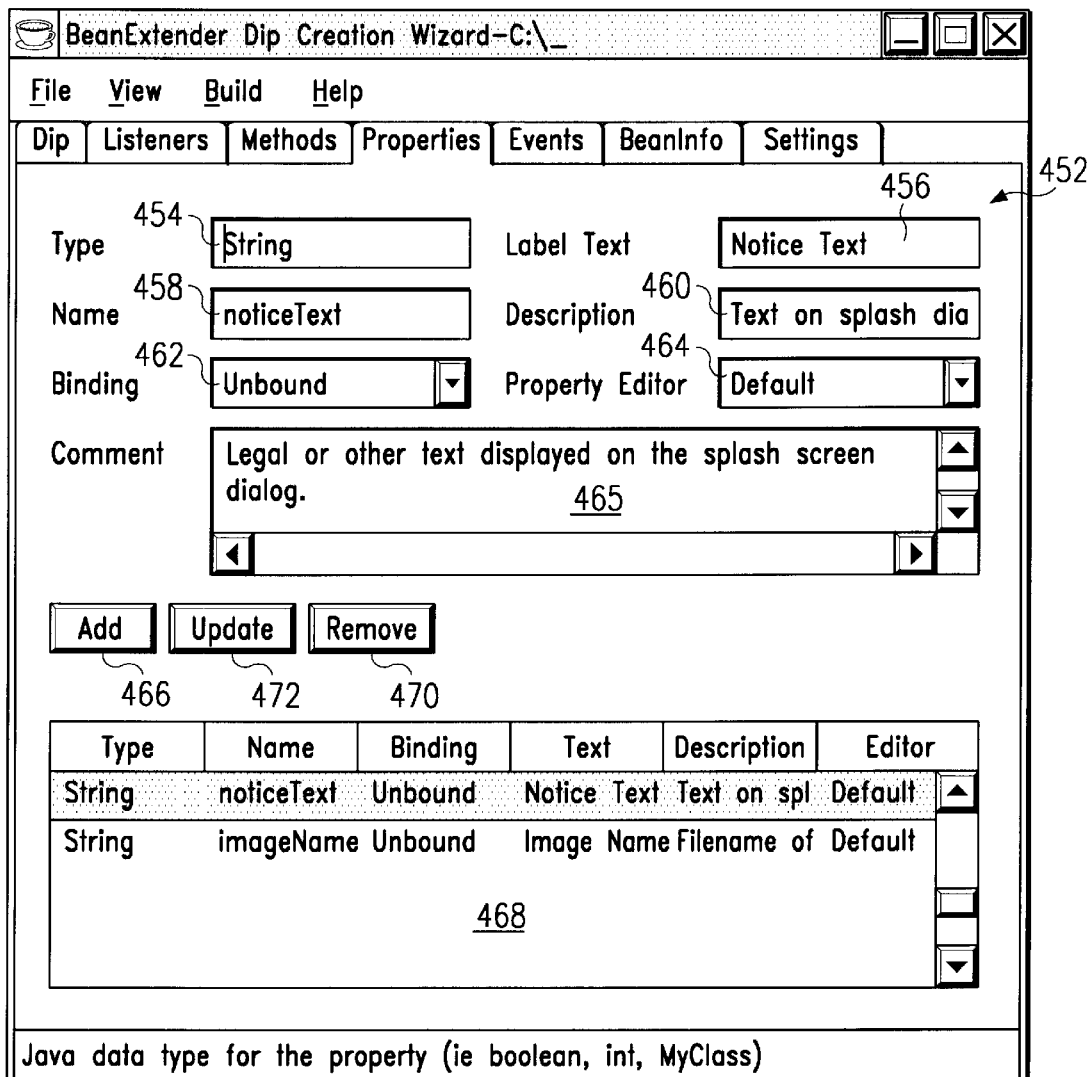

In FIG. 4D, GUI 400 displays properties page 452, which allows a user to specify various properties for the dip. Field 454 allows for an entry of a type of property, field 456 provides for the entry of label text, field 458 allows for the entry of a name, and field 460 allows for the entry of a description. Field 462 allows for selecting of a binding type while field 464 allows for the selection of a property editor. Commentary may be entered into field 465. If the entries are acceptable to the user, the selection of add button 466 will add a property. A property may be removed by selecting the property in field list box 468 and selecting remove button 470. Update button 472 may be used to make modifications to previously added properties. In this example, the user has specified that the dip will have two properties: noticeText and imageName. The noticeText property is a string that will be displayed in the TextArea on the splash dialog. The imageName property is a string containing the name of a graphics interchange format (gif) or jpg image (either from a file somewhere on disk or from a resource, such as an image within, a jar file) to be displayed on the splash dialog. If either property is unspecified, then its corresponding widget will not be part of the splash dialog. If both are unspecified, then the dialog will not be displayed at all.

Figure 4E:
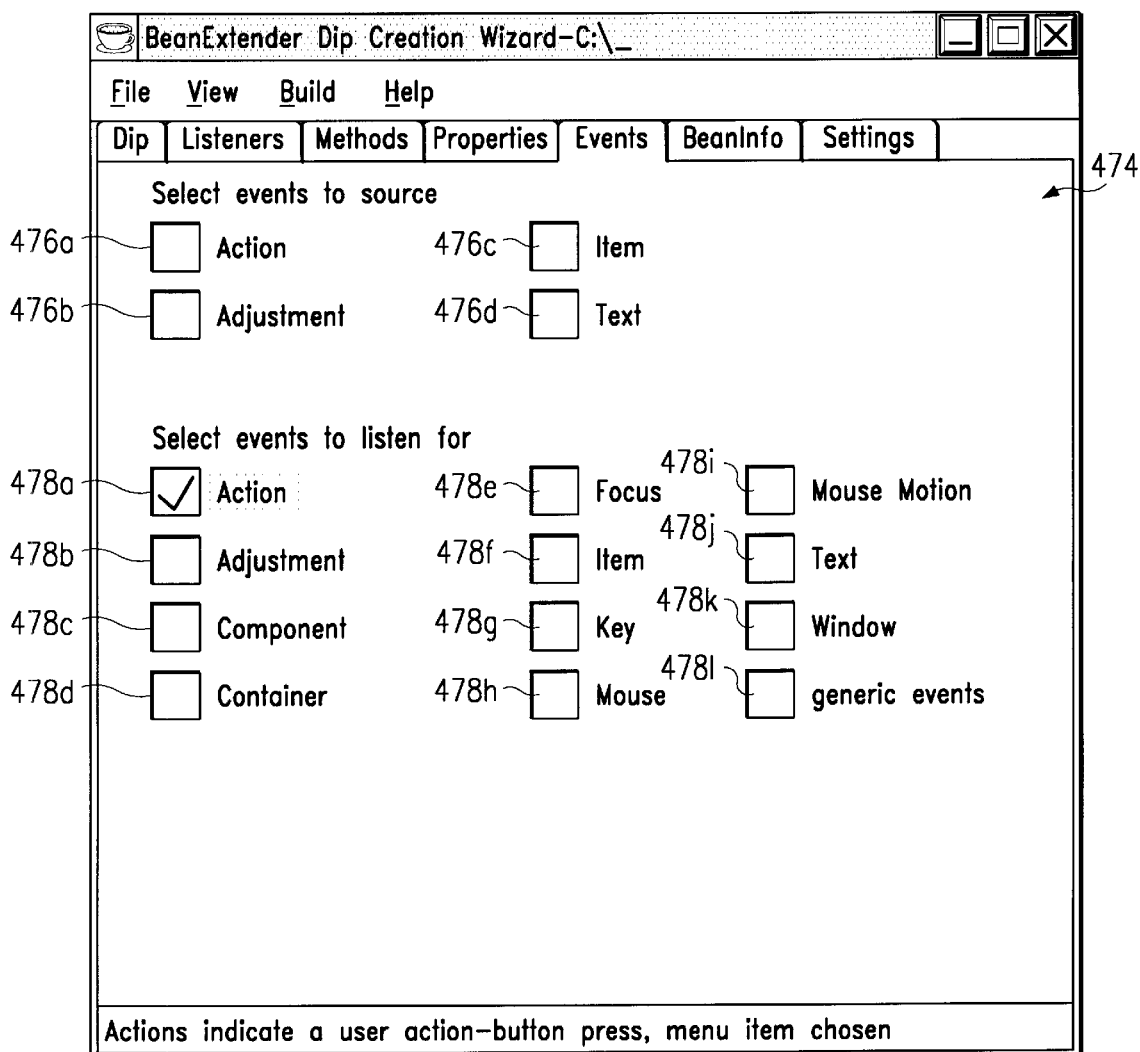

In FIG. 4E, GUI 400 displays an events page 474. Options 476a–476d provide events that a user may select to source. In this example, a user also may select events to listen for as shown in options 478a–478l. In this example, the user has specified that the dip will listen for action events, meaning that an actionListener interface will be used. The methods used in these examples are currently available methods found in the BeanExtender, a Java product currently available from International Business Machines Corporation. In this example, the action events will be generated by the selection of a dismissal button on a dialog. In response to receiving an action event, the splash dialog for this dip will be dismissed.

Figure 4F:
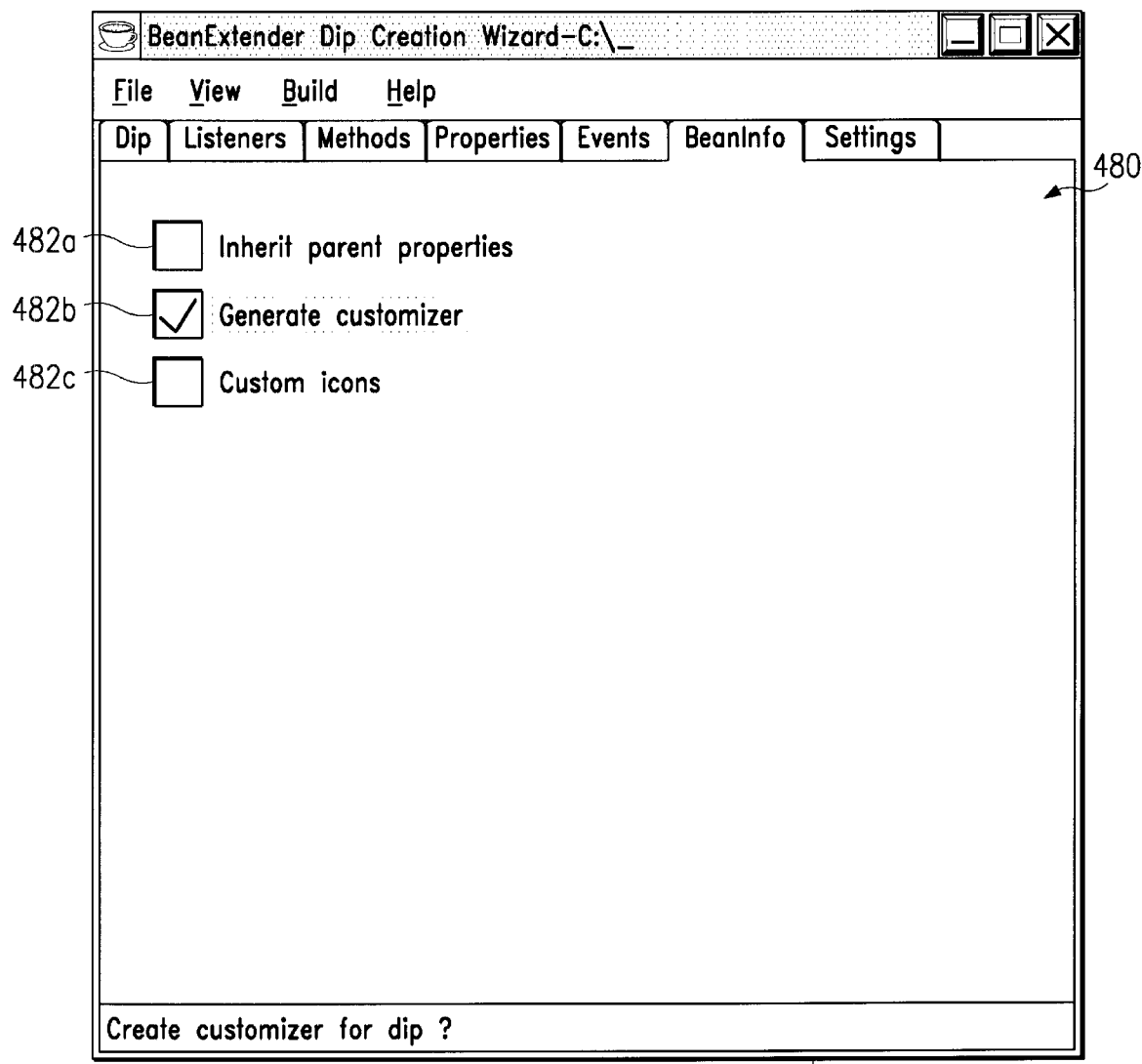

Turning now to FIG. 4F, a BeanInfo page 480 is presented by GUI 400. On this page, a user may select from options 482a–482c. Option 482a allows a dip to inherit parent properties. Option 482b, which is the selected option in this example, provides for the generation of a customizer that will contain controls for the two properties set in properties page 452 in FIG. 4D. Option 482c allows for the customization of icons.

Figure 4G:
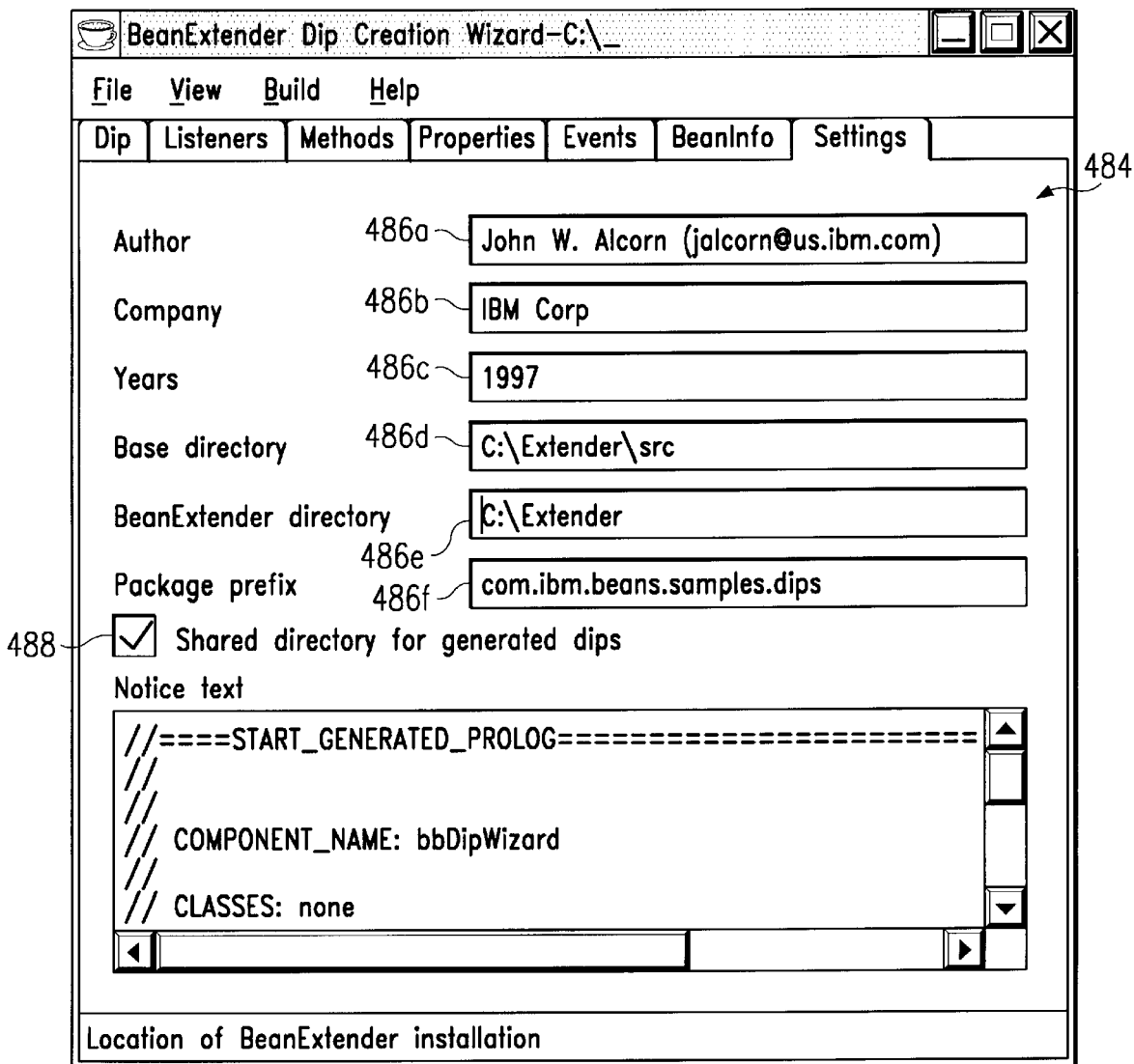
Figure 4H:
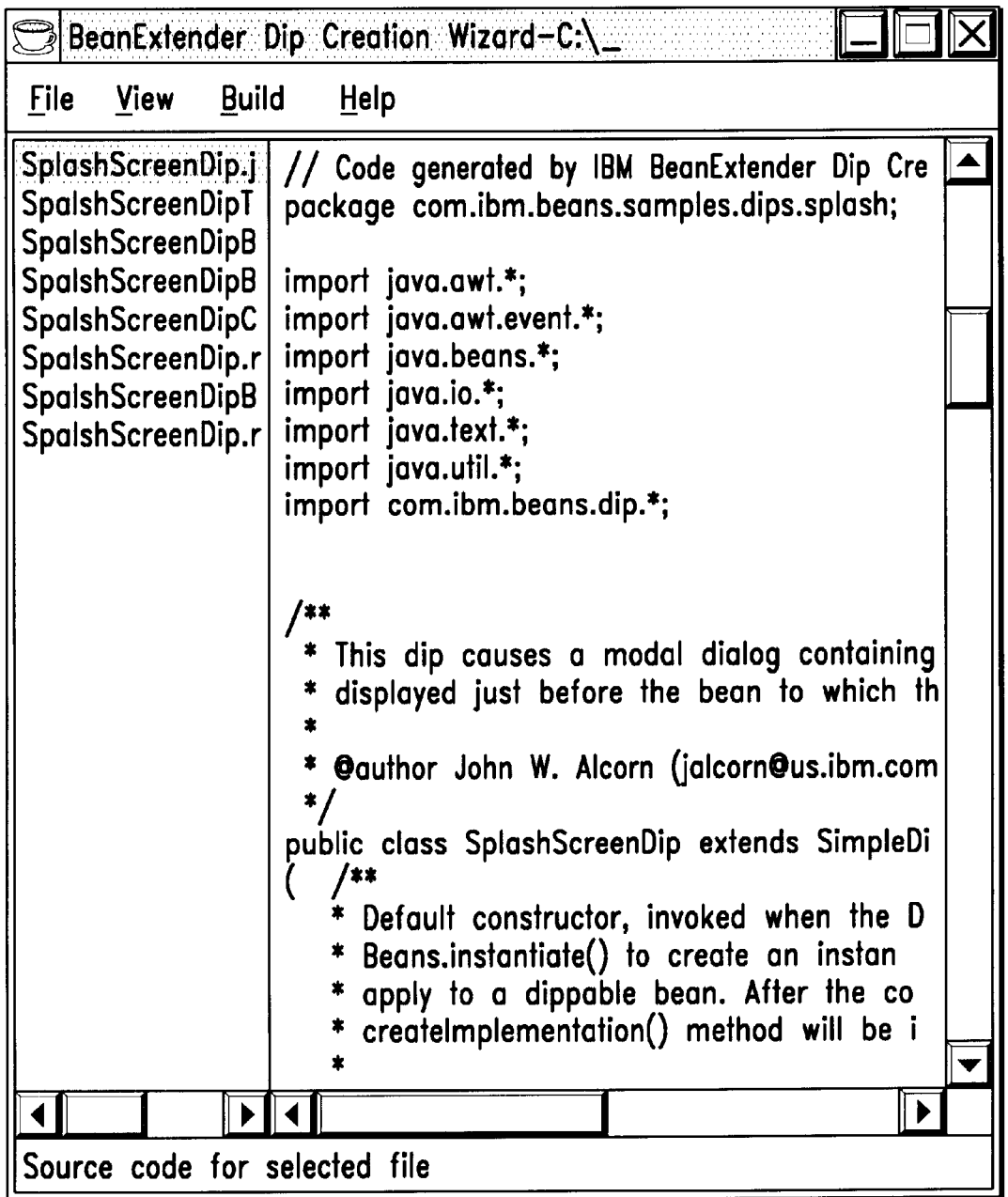
Figure 4I:
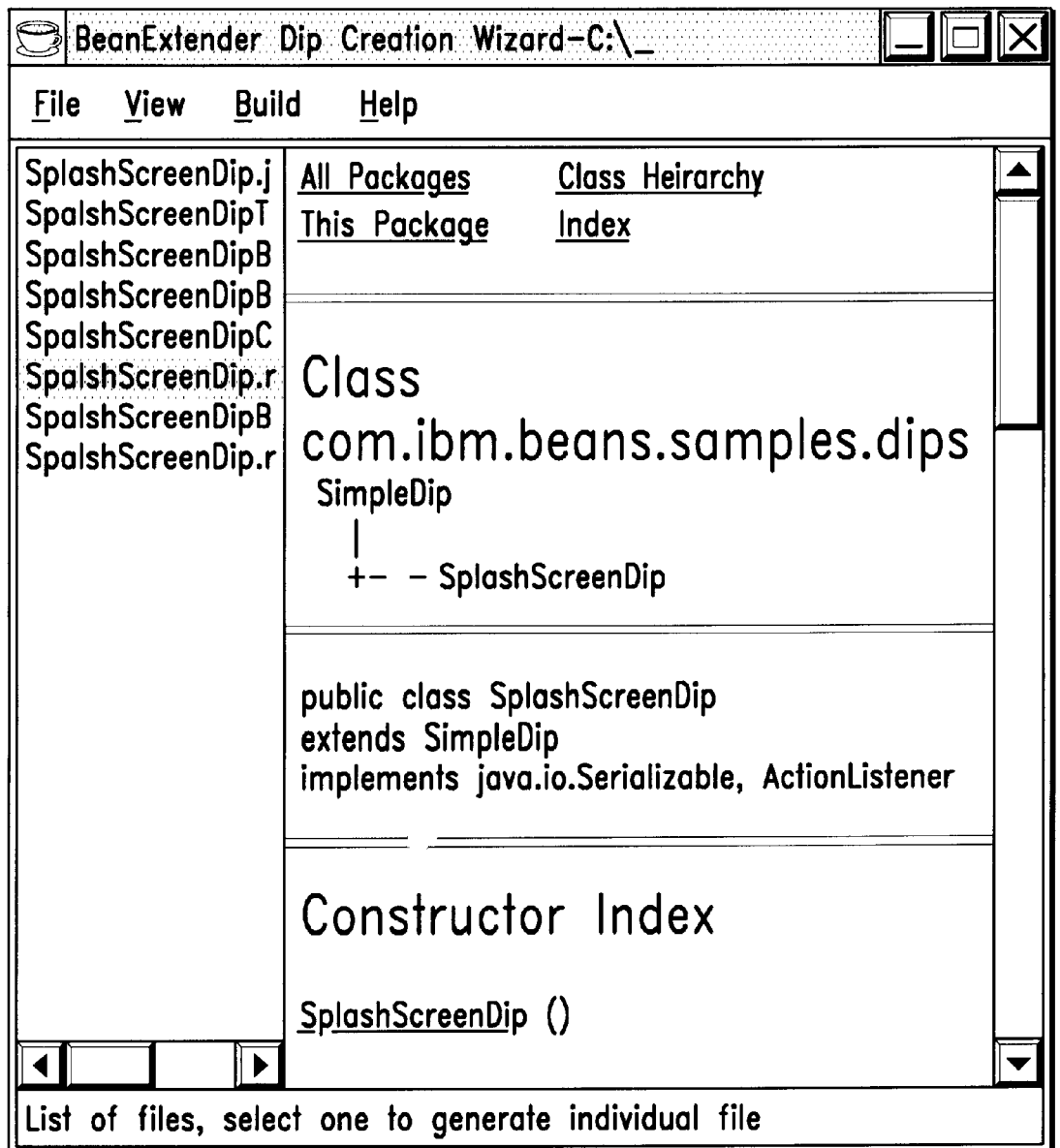

In FIG. 4G, GUI 400 presents a settings page 484. This page allows a user to enter information that will be placed or emitted into source files. For example, the name of the author may be entered into field 486a, the name of the company into field 486b, and the years into field 486c. A base directory for the file may be entered into field 486d along with a bean extender directory in field 486e. These two fields provide for setup information when the dip is to be used. A package prefix may be entered into field 486f. The package prefix provides information to be used as the default package in dip page 402 in FIG. 4A. Directories may be shared for generated dips by selecting option 488. Next, in FIG. 4H, GUI 400 presents a preview of a Java file that will be generated for the dip. In FIG. 4I, GUI 400 presents a preview of HyperText Markup Language (HTML) documentation that will be generated based on the information entered through GUI 400. When the user is satisfied with the information entered, the user may initiate a generation of the files for the dip to be emitted into the directory specified in field 486d in settings page 484 in FIG. 4G. As mentioned before, the source code for the dip generated is a framework or interface that allows the dip to work with a bean. At this point in time, the source code for the logic that provides the functionality of the dip may be added in the appropriate places in the framework. For example, the source code for the framework may include a comment such as "place code here for responding to addNotify ( )". The information input by the user through GUI 400 in FIGS. 4A–4I may be stored and retrieved for later use. In addition, the information may be modified at a later time using GUI 400.

Figure 5:
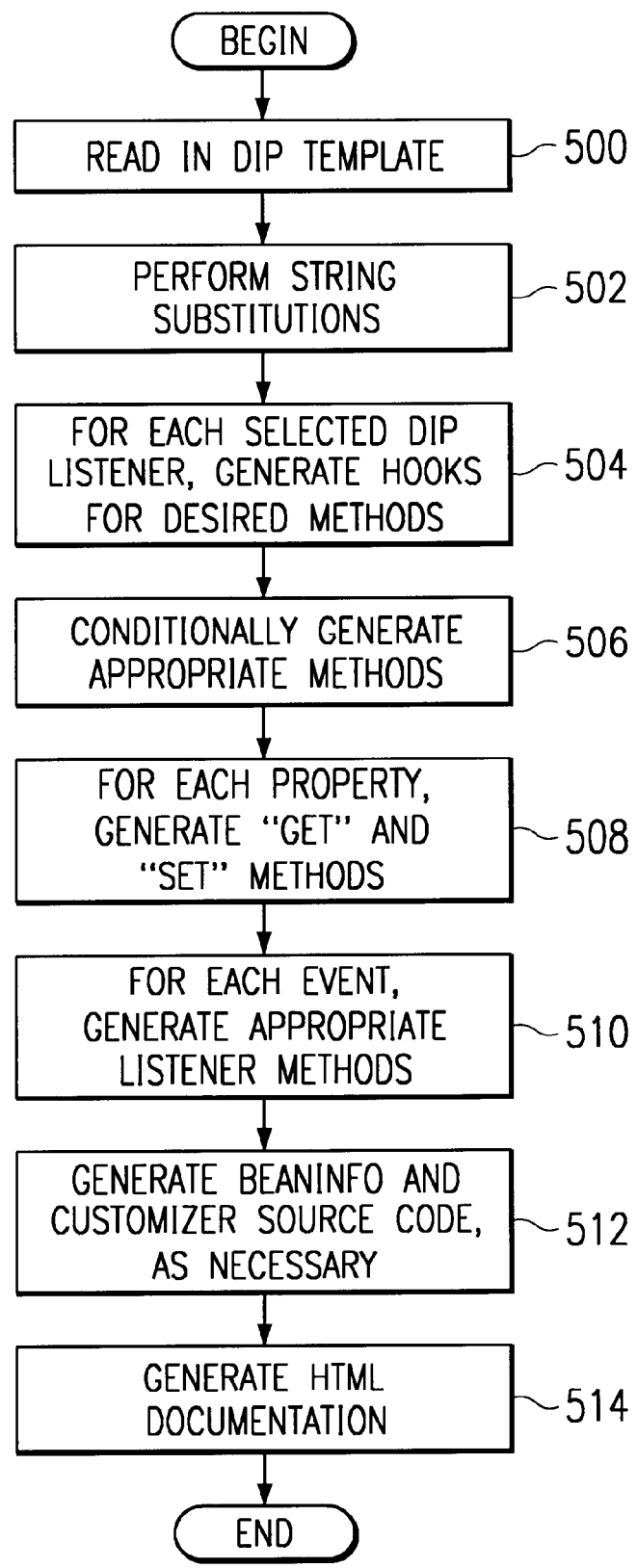
FIG. 5 is a flowchart of a process for creating a dip in accordance with a preferred embodiment of the present invention.

With reference now to FIG. 5, a flowchart of a process for creating a dip is depicted in accordance with a preferred embodiment of the present invention. The process in FIG. 5 is used to generate a dip from the information collected from the user. This information includes information gathered through the GUI as illustrated in FIGS. 4A–4I. The process begins by reading in a dip template (step 500). This dip template contains the source code in which modifications are made based on the user input. The process performs string substitutions (step 502). The template contains special strings that are enclosed by "#" symbols, such as, for example, "#DIP_NAME#", which are replaced with entries made by a user through the GUI. Of course, other mechanisms may be used to indicate the substitutions, such as for example, other symbols (i.e., "%" or "~") These substitutions in the source code are made based on the user input. Thereafter, for each dip listener selected, hooks are generated for the desired method (step 504). The desired methods are methods associated with the selected dip listeners. Next, appropriate methods are conditionally generated (step 506). The methods in step 506 are generated based on selections made in FIG. 4C. For each property, a "get" and "set" are generated (step 508). These properties are properties, such as those selected through GUI 400 on properties page 452 in FIG. 4D. For example, properties may include strings such as text or an image that is to be used by the dip. For each event selected by the user, appropriate listener methods are generated to process these events (step 510). Bean information and customizer source code is then generated as necessary (step 512). The bean information is placed into a file such that other objects can perform introspection on the dip to identify properties for the dip. The customized source code allows for customization for properties in the dip. In the depicted-example, this customization may be to allow setting of properties of the dip through a dialog. The source code is generated using the user input and the dip template along with the various methods generated in response to the user input. Then, HTML documentation is generated (step 514) with the process terminating thereafter.

With reference now to FIGS. 6A 6B and 6C, examples of code from a source code template are illustrated in accordance with a preferred embodiment of the present invention. In the depicted example, a source code template will include the framework for a dip. Substitutions and methods will be selected for use in the template based on user input received from the GUI. After changes have been made to the source code template, only the specific function performed by the dip need be added in accordance with the preferred embodiment. Alternately, the present invention also may insert functionality into the dip depending on the implementation. The code sections in FIGS. 6A through 6C are examples of source code that may be found within a source code template. The strings between "#" symbols are strings that are replaced with using user input for settings gathered through the GUI as described above in FIGS. 4A–4I. Section 600 in FIG. 6A illustrates code for returning the priority of a dip in relation to all other dips. This code returns a priority that is used to determine which dips are acted on first. A higher priority means that the dip gets a notification before other dips. In this example, the "#PRIORITY#" string is replaced by "100". The "100" was obtained in dip page 402 in GUI 400 from field 412. Section 602 depicts code that is used to indicate whether the dip has a separate implementation class and if the dip can be applied to the specified bean. Section 604 illustrates code in the source code template used for a listener method. This code is used to send a dip a notification of a call to specified methods in a dippable bean to which the dip is attached.

Only a few examples of source code for a source code template were shown in order to illustrate the form of the code and the substitutions that are made from settings set by the user through the GUI. The source code template will contain other source code required for the framework of the dip and the source code used will vary depending on the implementation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer for creating a framework for a dip, tile method comprising the computer implemented steps of:

displaying selections for settings for the dip in a graphical user interface;

receiving selections for settings for the dip through the graphical user interface, wherein selected policies are formed; and generating a source code for the dip using the selected policies, wherein the source code is generated and forms the framework for the dip;

whereby a user is assisted in creating the dip to modify the behavior of a dippable object.

2. The method of claim 1, wherein the dip includes an interface portion and a logic portion, wherein the generated source code is the interface portion.

3. The method of claim 2 further comprising:

receiving source code for the logic portion; and compiling the generated code framework and source, code for the logic portion to form the dip.

4. The method of claim 3, where in the generated source code includes an indication identifying a location for placement of the source code for the logic portion.

5. The method of claim 1, wherein the selections include listeners used by the dip to receive notifications.

6. The method of claim 1, wherein the selections include methods.

7. The method of claim 1, wherein the selections include events that will be monitored for by the dip.

8. The method of claim 1, wherein the selections include properties for the dip.

9. The method of claim 1 further comprising:

displaying a preview of the generated source code prior to generating the source code framework for the dip.

10. The method of claim 1 further comprising:

generating documentation for the dip based on the selected settings.

11. The method of claim 1 further comprising:

generating information, which allows other objects to identify properties of the dip.

12. The method of claim 1 further comprising:

generating customizer source code, which allows setting of properties of the dip by a user.

13. The method of claim 1, wherein the settings are stored for retrieval at a later time.

14. The method of claim 1, wherein the step of generating source code for the dip comprises:

using a source code template to generate source code for the dip.

15. The method of claim 14, wherein the source code template includes strings that are substituted using settings for the dip.

16. The method of claim 15, wherein the stings are located between selected symbols.

17. The method of claim 1, wherein said method is performed in an object oriented programming language.

18. A data processing system in a computer for creating a framework for a dip, the data processing system comprising:

displaying means for displaying selections for settings for the dip in a graphical user interface;

receiving means for receiving selections for settings for the dip through the graphical user interface, wherein selected policies are formed; and generating means for generating a source code for the dip using the selected policies, wherein the source code is generated source code and forms the framework for the dip;

whereby said data processing system is capable of assisting a user in creating a dip to modify the behavior of a dippable object.

19. The data processing system of claim 18, wherein the dip includes an interface portion and a logic portion, wherein the generated source code is the interface portion.

20. The data processing system of claim 19 further comprising:

receiving means for diving source code for the logic portion; and compiling means for compiling the generated code framework and source code for the logic portion to form the dip.

21. The data processing system of claim 20, wherein the generated source code includes an indication identifying a location for placement of the source code for the logic portion.

22. The data processing system of claim 18, wherein the selections include listeners used by the dip to receive notifications.

23. The data processing system of claim 18, wherein the selections include methods.

24. The data processing system of claim 18, wherein the selections include events that will be monitored for by the dip.

25. The data processing system of claim 18, wherein the selections include properties for the dip.

26. The data processing system of claim 18 further comprising:

displaying means for displaying a preview of the generated source code prior to generating the source code framework for the dip.

27. The data processing system of claim 18 further comprising:

generating means for generating documentation for the dip based on the selected settings.

28. The data processing system of claim 18 further comprising:

generating means for generating information, which allows other objects to identify properties of the dip.

29. The data processing system of claim 18 further comprising:

generating means for generating customizer source code, which allows setting of properties of the dip by a user.

30. The data processing system of claim 18, wherein the settings are stored for retrieval at a later time.

31. The data processing system of claim 18, wherein the step of generating source code for the dip comprises:

generation means for using a source code template to generate source code for the dip.

32. The data processing system of claim 31, wherein the source code template includes strings that are substituted using settings for the dip.

33. The data processing system of claim 32, wherein the stings are located between selected symbols.

34. The data processing system of claim 18, wherein said displaying means, said receiving means, and said generating means are in an object oriented programming language.

35. A computer program product in a computer readable medium for creating a framework for a dip, the computer program product comprising:

first instructions for displaying selections for settings for the dip in a graphical user interface;

second instructions for receiving selections for settings for the dip through the graphical user interface, wherein selected policies are formed; and third instructions for generating a source code for the dip using the selected policies, wherein the source code is generated source code and forms the framework for the dip;

whereby said computer program product is capable of assisting a user in creating a dip to modify the behavior of a dippable object.

36. The computer program product of claim 35, wherein said first, said second and said third instructions are in an object oriented programming language.

* * * * *

UNITED STATES PATENT AND TRADEMARK OFFICE
CERTIFICATE OF CORRECTION

PATENT NO.  : 6,556,218 B1
DATED       : April 29, 2003
INVENTOR(S) : Alcorn

Page 1 of 1

It is certified that error appears in the above-identified patent and that said Letters Patent is hereby corrected as shown below:

Column 10,
Line 65, after "a dip," delete "tile" and insert -- the --.

Column 11,
Line 68, after "means for", delete "diving" and insert -- receiving --.

Column 12,
Line 45, delete "stings" and insert -- strings --.

Signed and Sealed this

Twenty-third Day of March, 2004

JON W. DUDAS
*Acting Director of the United States Patent and Trademark Office*